US008923018B2

(12) United States Patent
Hu et al.

(10) Patent No.: US 8,923,018 B2
(45) Date of Patent: Dec. 30, 2014

(54) DC/DC CONVERTER, POWER CONVERTER AND CONTROL METHOD THEREOF

(75) Inventors: Pei-Qing Hu, Shanghai (CN); Hong-Yuan Jin, Shanghai (CN); Hong-Jian Gan, Shanghai (CN); Jian-Ping Ying, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 287 days.

(21) Appl. No.: 13/424,387

(22) Filed: Mar. 20, 2012

(65) Prior Publication Data
US 2012/0250361 A1 Oct. 4, 2012

Related U.S. Application Data

(60) Provisional application No. 61/468,215, filed on Mar. 28, 2011.

(51) Int. Cl.
*H02M 3/335* (2006.01)
*H02M 1/00* (2006.01)

(52) U.S. Cl.
CPC .. *H02M 3/33569* (2013.01); *H02M 2001/0035* (2013.01); *H02M 2001/0058* (2013.01); *Y02B 70/1433* (2013.01); *Y02B 70/1491* (2013.01); *Y02B 70/16* (2013.01)
USPC ....................................................... 363/21.02

(58) Field of Classification Search
USPC .............. 363/20, 21.01, 21.02, 39, 40, 95, 97
See application file for complete search history.

(56) References Cited

U.S. PATENT DOCUMENTS 8,320,138 B2 * 11/2012 Aso ................................ 363/16
2009/0175056 A1 7/2009 Choi

FOREIGN PATENT DOCUMENTS

| CN | 101447163 A | 6/2009 |
| JP | 2010011625 A | 1/2010 |
| TW | M396538 | 1/2011 |
| WO | 2008146974 A1 | 12/2008 |

OTHER PUBLICATIONS

NCP1396A, NCP1396B, High Performance Resonant Mode Controller featuring High-Voltage Drivers, www.onsemi.com, Nov. 2010.
NCP1608, Critical Conduction Mode PFC Controller Utilizing a Transconductance Error Amplifier, www.onsemi.com, Jun. 2010.

* cited by examiner

*Primary Examiner* — Adolf Berhane
*Assistant Examiner* — Afework Demisse
(74) *Attorney, Agent, or Firm* — CKC & Partners Co., Ltd.

(57) ABSTRACT

A DC/DC converter, a power converter and a control method thereof are disclosed, where the DC/DC converter includes an output circuit having a load, a rectangular wave generator having a bridge arm, a resonant tank, a detection unit and a control unit. The bridge arm includes a first and a second switches connected each other. The detection unit detects a signal related to a state of the load. When the state of the load is a light-load or a no-load, the control unit controls ON/OFF state of the first and second switches by pulse width modulation mode to convert an input voltage into at least one rectangular wave for the resonant tank. A duty ratio of the first switch is within a first or second predetermined range, and a duty ratio of the second switch is complementary to the duty ratio of the first switch, whereby a voltage gain of the DC/DC converter is greater than 1.

33 Claims, 6 Drawing Sheets

DC/DC CONVERTER, POWER CONVERTER AND CONTROL METHOD THEREOF

RELATED APPLICATIONS

This application claims priority to U.S. Provisional Application Ser. No. 61/468,215, filed Mar. 28, 2011, which is herein incorporated by reference.

BACKGROUND

1. Technical Field

The present disclosure relates to power electronic, and more particularly, a power converter and a control method thereof.

2. Description of Related Art

In recent years, with the fast development of the energy conservation technology, more and more customers desire that a switching-mode converter can achieve high conversion efficiency in a wide load range, so improving the efficiency of this converter in a light-load or a no-load is also very important. In this regard, the International Energy Agency (IEA), the United States and Europe and other countries and organizations have been established or are establishing standards to limit a loss of the switching-mode converter in the light-load and the no-load.

By using resonant converter technology, a series resonant DC/DC converter can realize zero voltage switching, and therefore power loss is very small, and power converter efficiency in full-load is high. FIG. 1 is a block diagram of a LLC series resonant DC/DC converter. This topology is commonly based on a frequency modulation mode to stabilize the output voltage by changing the frequency of rectangular waves, in which the duty ratio is 50%, as shown in FIG. 2. The relationship between the power output-voltage gain M and a working frequency is:

$$M = \frac{2n*V_o}{V_{in}} = \frac{1}{\sqrt{\left\{1+\frac{L_s}{L_m}\left[1-\left(\frac{f_s}{f}\right)^2\right]\right\}^2 + Q^2\left(\frac{f}{f_s}-\frac{f_s}{f}\right)^2}}.$$

wherein, the resonance frequency $$f_s = \frac{1}{2\pi\sqrt{C_s*L_s}}, \quad Q = \frac{2\pi f_s L_s}{\frac{8}{\pi^2}n^2 R_L}.$$

wherein $L_s$ is a resonant inductance value, $L_m$ is a magnetizing inductance value, $C_s$ is a resonant capacitance value, f is the working frequency of the rectangular wave, n is a turns ratio of a transformer, and $R_L$ is a resistance value of the output load.

As shown in FIG. 3, the working method in the light-load is as follows: detecting a state of the load, and controlling the series resonant converter to increase the working frequency of the rectangular wave as the load is decreased; when the working frequency achieves a predetermined value, the working frequency is maintained at this value, and this converter operates in an intermittent control mode (i.e., a hiccup mode).

Existing method for improving the efficiency in the light-load is as follows:

1. Reducing the working frequency of the converter. Because switching losses and driver losses in power devices account for a large proportion of losses in light-load, so reducing the switching frequency can effectively reduce these losses, thus reducing the light-load losses, which applies to PWM (Pulse Width Modulation) circuit.

2. Controlling the converter operates in an intermittent mode. By detecting a voltage error amplifier signal, the converter which is in light-load works in an intermittent mode, so as to reduce the on-off times of the converter switch per unit time, and thereby reducing standby losses.

In the resonant circuit, only reducing the working frequency cannot effectively control the output voltage, and therefore the above first method cannot be implemented. Above second method may improve the efficiency in the light-load to a certain extent, but when the working frequency of the converter is higher, the gain is less than 1, as shown in FIG. 4. Therefore, in each work cycle, transmission energy is lower; thus the on-off times of the converter switch is still too much, and excessive switching loss and driving loss per unit time are also higher. Thus, the second method cannot reach the limit standard for the light-load loss.

In view of the foregoing, there is an urgent need in the related field to provide a way to improve the efficiency in the light-load more efficiently.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one or more various aspects, the present disclosure is directed to a power converter and a method of controlling the power converter to meet the requirements for high efficiency in the light-load.

According to one embodiment of the present invention, a DC/DC converter includes an output circuit, a rectangular wave generator, a resonant tank, a detection unit and a control unit. The output circuit has a load. The resonant tank is electrically coupled with the output circuit. The rectangular wave generator is electrically coupled with the resonant tank, and the rectangular wave generator has at least one bridge arm including a first switch and a second switch coupled to each other. The detection unit detects a signal related to a state of the load. The control unit controls a ON/OFF state of the first and second switches by a pulse width modulation mode to convert an input voltage into at least one rectangular wave for the resonant tank when the state of the load is a light-load or a no-load, wherein a duty ratio of the first switch is within a first or second predetermined range, and a duty ratio of the second switch is complementary to the duty ratio of the first switch, whereby a voltage gain of the DC/DC converter is greater than 1.

When the state of the load is the light-load or the no-load, the working frequency of the rectangular wave is higher than a resonance frequency of the resonant tank.

When the state of the load is the heavy-load or the full-load, the control unit controls the rectangular wave generator in a frequency modulation mode.

The duty ratio of the first switch is between a first upper limit that is less than 0.5 and a first lower limit value, and the duty ratio of the second switch is between a second lower limit value that is greater than 0.5 and a second upper limit.

Alternatively, the duty ratio of the second switch is between a first upper limit that is less than 0.5 and a first lower limit value, and the duty ratio of the first switch is between a second lower limit value that is greater than 0.5 and a second upper limit.

The load includes a resistor.

The output circuit further includes a transformer and a rectifier both electrically connected to the resistor.

The resonant tank is a serial resonant circuit or a parallel resonant circuit.

The serial resonant circuit is a LC series resonant circuit or a LLC series resonant circuit.

The LLC series resonant circuit includes a magnetizing inductor, a resonant inductor and a resonant capacitor connected to each other in series, wherein the magnetizing inductor and the transformer are connected in parallel.

The magnetizing inductor, the resonant inductor and the resonant capacitor connected to the second switch in parallel, and the control unit controls that the duty ratio of the first switch is less than 0.5; when the control unit turns on the first switch and turns off the second switch, the transformer transfers energy to a secondary side by a clamping voltage of the magnetizing inductor.

When the control unit turns off the first switch and turns on the second switch, the transformer is incapable of transferring the energy to the secondary side.

The duty ratio of the first switch plus the duty ratio of the second switch equals 1, the duty ratio of the first switch is between a first upper limit that is less than 0.5 and a first lower limit value, and the duty ratio of the second switch is between a second lower limit value that is greater than 0.5 and a second upper limit.

Alternatively, the control unit controls that the duty ratio of the first switch is greater than 0.5; when the control unit turns on the first switch and turns off the second switch, the transformer is incapable of transferring energy to a secondary side.

When the control unit turns off the first switch and turns on the second switch, the transformer transfers the energy to the secondary side by a clamping voltage of the magnetizing inductor.

The duty ratio of the first switch plus the duty ratio of the second switch equals 1, the duty ratio of the second switch is between a first upper limit that is less than 0.5 and a first lower limit value, and the duty ratio of the first switch is between a second lower limit value that is greater than 0.5 and a second upper limit.

According to another embodiment of the present invention, a power converter includes above DC/DC converter, a power factor correction device and an electromagnetic interference filter. The power factor correction device is electrically coupled with the DC/DC converter. The electromagnetic interference filter is electrically coupled with the power factor correction device for receiving alternating current, wherein the electromagnetic interference filter and the power factor correction device convert the alternating current into the input voltage and provide the input voltage for the DC/DC converter.

When the state of the load is the light-load or the no-load, the power factor correction device reduces the input voltage provided for the DC/DC converter.

When the state of the load is the light-load or the no-load, the power factor correction device is turned off.

The power factor correction device includes a bridge rectifier and a power factor corrector. The power factor corrector is electrically coupled with the bridge rectifier.

The power factor correction device includes a bridgeless power factor corrector.

According to yet another embodiment of the present invention, a method of controlling a power converter, wherein the power converter includes a resonant tank and an output circuit having a load, the resonant tank is electrically coupled with the load, the method includes following steps: detecting a signal related to a state of the load; when the state of the load is a light-load or a no-load, controlling a ON/OFF state of a first and a second switches of a bridge arm by a pulse width modulation mode to convert an input voltage into at least one rectangular wave for the resonant tank, wherein a duty ratio of the first switch is within a first or second predetermined range, and a duty ratio of the second switch is complementary to the duty ratio of the first switch, whereby a voltage gain of the power converter is greater than 1.

The method further includes: when the state of the load is the light-load or the no-load, controlling the working frequency of the rectangular wave to be higher than a resonance frequency.

The method further includes: when the state of the load is a heavy-load or a full-load, modulating the rectangular wave in a frequency modulation mode.

The duty ratio of the first switch is between a first upper limit that is less than 0.5 and a first lower limit value, and the duty ratio of the second switch is between a second lower limit value that is greater than 0.5 and a second upper limit. Alternatively, the duty ratio of the second switch is between a first upper limit that is less than 0.5 and a first lower limit value, and the duty ratio of the first switch is between a second lower limit value that is greater than 0.5 and a second upper limit.

The output circuit further includes a transformer, and the resonant tank comprises a magnetizing inductor, a resonant inductor and a resonant capacitor connected to each other in series, wherein the magnetizing inductor and the transformer are connected in parallel, the magnetizing inductor, the resonant inductor and the resonant capacitor connected to the second switch in parallel, and the method further includes: controlling that the duty ratio of the first switch is less than 0.5, wherein when the first switch is turned on and the second switch is turned off, the transformer transfers energy to a secondary side by a clamping voltage of the magnetizing inductor; when the first switch is turned off and the second switch is turned on, the transformer is incapable of transferring the energy to the secondary side.

The duty ratio of the first switch plus the duty ratio of the second switch equals 1, the duty ratio of the first switch is between a first upper limit that is less than 0.5 and a first lower limit value, and the duty ratio of the second switch is between a second lower limit value that is greater than 0.5 and a second upper limit.

Alternatively, the output circuit further comprises a transformer, and the resonant tank comprises a magnetizing inductor, a resonant inductor and a resonant capacitor connected to each other in series, wherein the magnetizing inductor and the output circuit are connected in parallel, the magnetizing inductor, the resonant inductor and the resonant capacitor connected to the second switch in parallel, and the method further comprises: controlling that the duty ratio of the first switch is greater than 0.5, wherein when the first switch is turned off and the second switch is turned on, the transformer transfers energy to a secondary side by a clamping voltage of the magnetizing inductor; when the first switch is turned on and the second switch is turned off, the transformer is incapable of transferring the energy to the secondary side.

The duty ratio of the first switch plus the duty ratio of the second switch equals 1, the duty ratio of the second switch is between a first upper limit that is less than 0.5 and a first lower limit value, and the duty ratio of the first switch is between a second lower limit value that is greater than 0.5 and a second upper limit.

The method further includes: configuring an electromagnetic interference filter to receive alternating current, the electromagnetic interference filter and a power factor correction device convert the alternating current into the input voltage and provide the input voltage for the output circuit.

The method further includes: when the state of the load is the light-load or the no-load, reducing the input voltage provided from the power factor correction device.

The method further includes: when the state of the load is the light-load or the no-load, turning off the power factor correction device.

Technical advantages are generally achieved, by embodiments of the present invention, as follows: because the ON/OFF state of the switches are controlled by the pulse width modulation mode when the state of the load is the light-load or the no-load, in which the working frequency is higher than the resonance frequency and the voltage gain is greater than 1, the on-off times of the converter switch per unit time is reduced more efficiently and the efficiency in the light-load is improved, so as to meet the requirements for high efficiency in the light-load.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1:
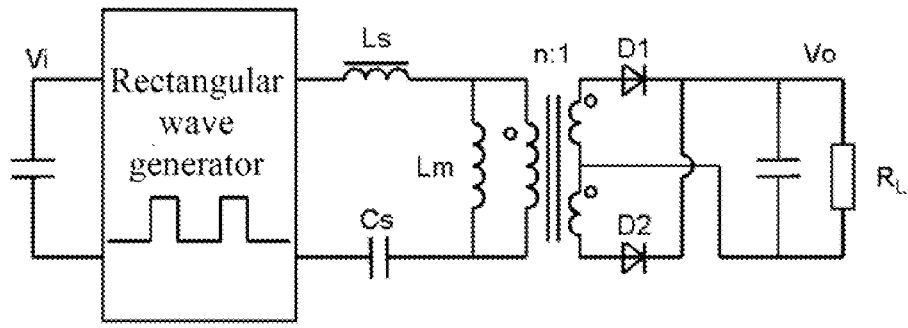
FIG. 1 is a block diagram of a LLC series resonant DC/DC converter.
Figure 2:
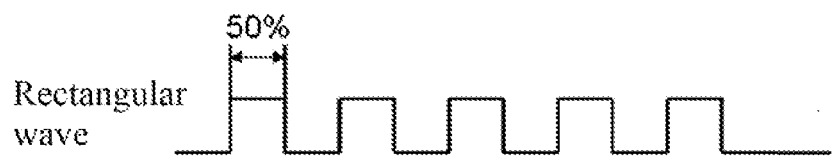
FIG. 2 is a conventional driving waveform of a rectangular wave generator of FIG. 1.
Figure 3:
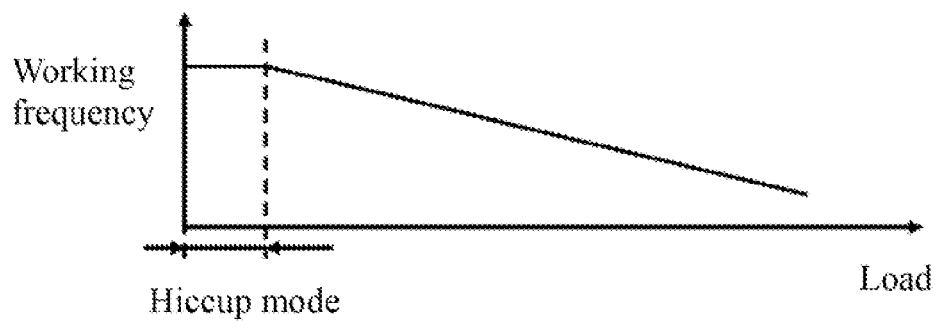
FIG. 3 illustrates a conventional method of controlling the LLC series resonant DC/DC converter of FIG. 1.
Figure 4:
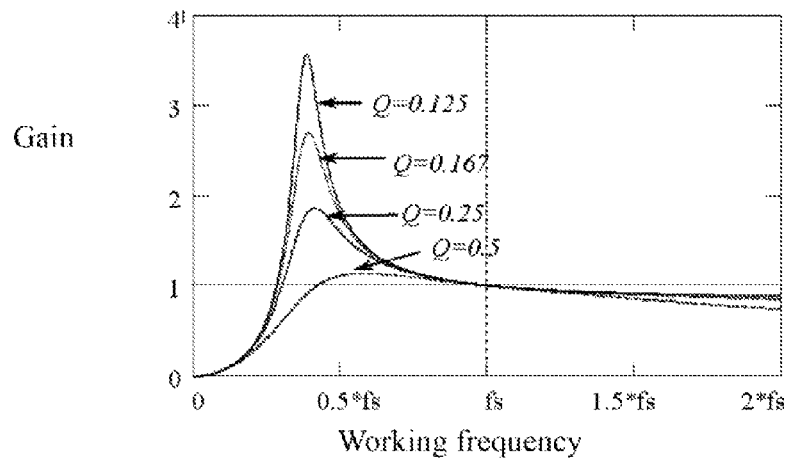
FIG. 4 shows a gain curve of the LLC series resonant DC/DC converter according to the conventional method.

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 5:
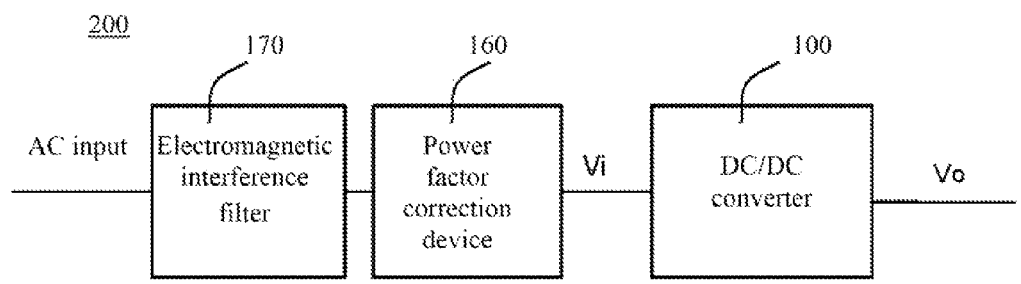
FIG. 5 is a block diagram of a power converter according to one embodiment of the present disclosure.

In one or more various aspects, the present invention is directed to meet the requirements for high efficiency in the light-load. Referring to FIG. 5, illustrated is a block diagram of a power converter 200 according to one embodiment of the present disclosure. The power converter 200 includes a DC/DC converter 100, a power factor correction device 160 and an electromagnetic interference filter 170. The power factor correction device 160 is electrically coupled with the DC/DC converter 100. The electromagnetic interference filter 170 is electrically coupled with the power factor correction device 160. In use, the electromagnetic interference filter 170 receives alternating current, and the electromagnetic interference filter 170 and the power factor correction device 160 convert the alternating current into the input voltage and provide the input voltage $V_i$ for the DC/DC converter 100.

Figure 6:
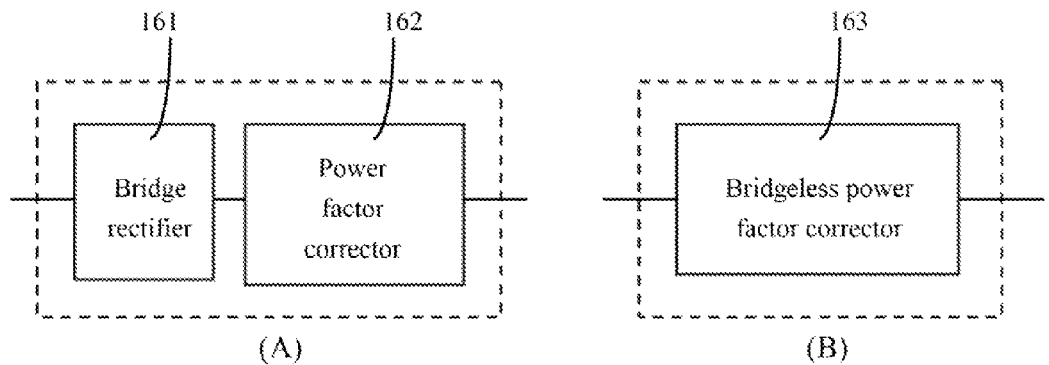
FIG. 6 is a block diagram of a power factor correction device according to one embodiment of the present disclosure.

As shown in FIG. 6, (A) the power factor correction device 160 includes a bridge rectifier 161 and a power factor corrector 162, wherein the power factor corrector 161 is electrically coupled with the bridge rectifier 162; alternatively, (B) the power factor correction device 160 includes a bridgeless power factor corrector 163.

Figure 7:
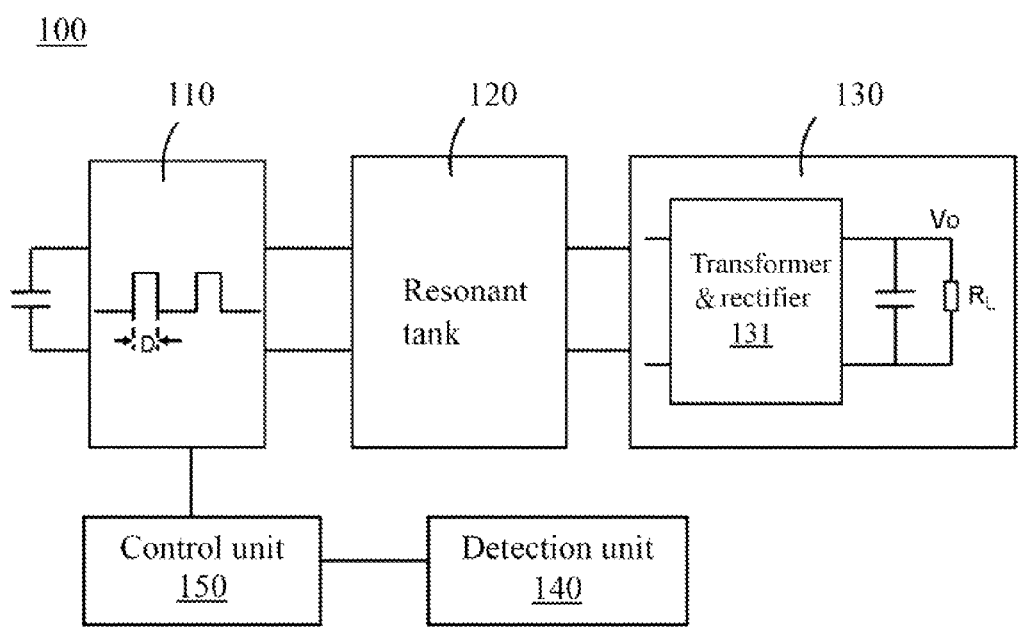
FIG. 7 is a block diagram of a DC/DC converter of FIG. 5 according to one embodiment of the present disclosure.

As shown in FIG. 7, the DC/DC converter 100 includes a rectangular wave generator 110, a resonant tank 120, an output circuit 130, a detection unit 140 and a control unit 150. The rectangular wave generator 110 is electrically coupled with the resonant tank 120. The resonant tank 120 is electrically coupled with the output circuit 130. The output circuit 130 is electrically coupled with the detection unit 140. The detection unit 140 is electrically coupled with the control unit 150. The control unit 150 is electrically coupled with the rectangular wave generator 110.

Figure 8:
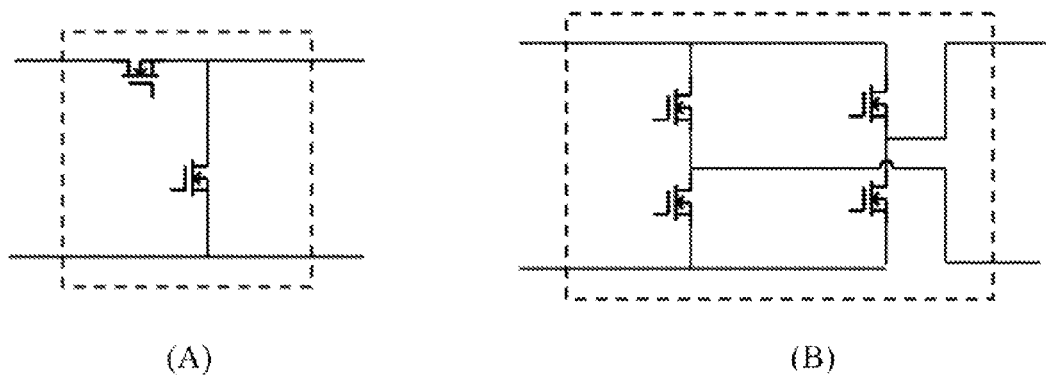
FIG. 8 is a circuit diagram of a rectangular wave generator according to one embodiment of the present disclosure.

The rectangular wave generator 110 includes one or more switches, such as half-bridge circuit (A) or a full-bridge circuit (B) in FIG. 8. The control unit 150 controls an on/off state of the switch to output the rectangular wave, wherein amplitude of the rectangular wave is equal to the input voltage, where D represents the duty ratio of the rectangular wave, and f represents the frequency of the rectangular wave. Alternatively, in another embodiment, the amplitude of the rectangular wave is the double of the input voltage. Those with ordinary skill in the art may set the amplitude of the rectangular wave depending on the desired application.

Figure 9:
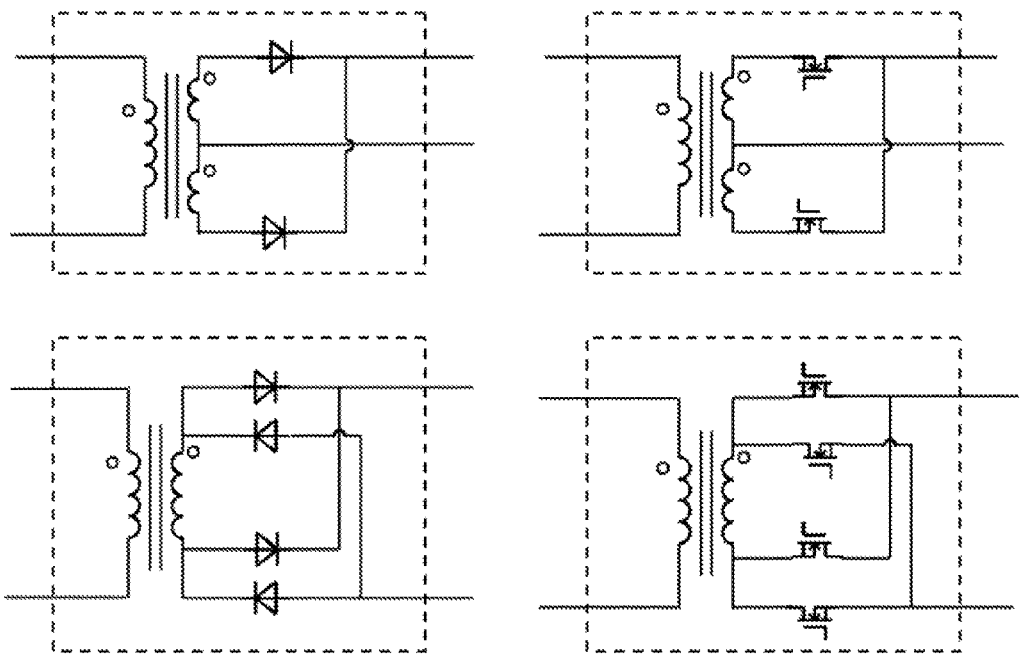
FIG. 9 is a circuit diagram of a transformer and a rectifier according to one embodiment of the present disclosure.

The output circuit 130 has a load $R_L$, such as a resistor. Alternatively, the output circuit 130 includes a transformer with a rectifier 131, and the load $R_L$, wherein the transformer and the rectifier 131 both electrically connected to the resistor. The rectifier may be a full-wave rectifier, a center-tapped rectifier, a diode rectifier, a synchronous rectifier, or the combination thereof, as shown in FIG. 9.

The resonant tank 120 may be a series resonant circuit, such as a LC series resonant circuit, a LLC series resonant circuit or the like, or a parallel resonant circuit. The output circuit 130 and one or more resonant devices of the resonant tank 120 are connected in parallel or series.

The control unit 150 may be hardware, software, and/or firmware. For example, if speed and accuracy are specific concerns, the control unit 150 may opt for a mainly hardware and/or firmware; alternatively, if flexibility is specific concerns, the control unit 150 may opt for a mainly software implementation; or, yet again alternatively, the control unit 150 may opt for some combination of hardware, software, and/or firmware. Hence, there are several possible implementation way by which the processes and/or devices and/or other technologies described herein may be effected, none of which is inherently superior to the other in that any implementation way to be utilized is a choice dependent upon the context in which the implementation way will be deployed and the specific concerns (e.g., speed, flexibility, or predictability), any of which may vary.

Figure 10:
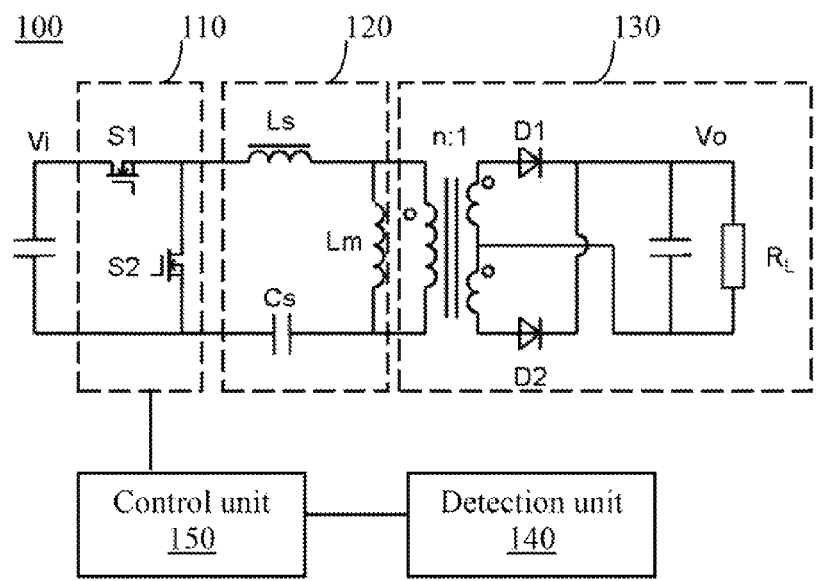
FIG. 10 shows circuit blocks of a LLC series resonant circuit according to one embodiment of the present disclosure.

Referring to FIG. 10, illustrated is a half-bridge LLC series resonant circuit according to one embodiment of the present disclosure. The rectangular wave generator 110 is electrically coupled with the resonant tank 120. The rectangular wave generator 110 has a bridge arm including a first switch S1 and a second switch S2 coupled to each other. The resonant tank 120 is a LLC series resonant circuit that includes a magnetizing inductor $L_m$, a resonant inductor $L_s$ and a resonant capacitor $C_s$ connected to each other in series, wherein the magnetizing inductor $L_m$ and the output circuit 130 are connected in parallel, and the magnetizing inductor $L_m$, the resonant inductor $L_s$ and the resonant capacitor $C_s$ connected to the second switch S2 in parallel.

When the DC/DC converter 100 operates, the rectangular wave generator 110 converts an input voltage into at least one rectangular wave for the resonant tank 120. The detection unit 140 detects a signal related to a state of the load $R_L$; for example, this signal may be a current signal of the primary side of the transformer, a current signal of the secondary side of the transformer, a current signal through the resonant inductor $L_s$ of the resonant tank 120, a voltage of the resonant capacitor $C_s$ or the like. When the state of the load is a light-load or a no-load, the control unit 150 controls a ON/OFF state of the first and second switches S1, S2 by a pulse width modulation mode to convert an input voltage into at least one rectangular wave for the resonant tank 120, wherein a duty ratio of the first switch S1 is within a first or second predetermined range, and a duty ratio of the second switch S2 is complementary to the duty ratio of the first switch S1, whereby a voltage gain of the DC/DC converter 100 is greater than 1.

Furthermore, when the state of the load is the heavy-load or the full-load, the control unit 150 controls the rectangular wave generator 110 in a frequency modulation mode. In the frequency modulation mode, the output voltage is stabilized by changing the frequency of rectangular waves, so as to meet the requirements for high efficiency in the heavy-load.

Figure 11:
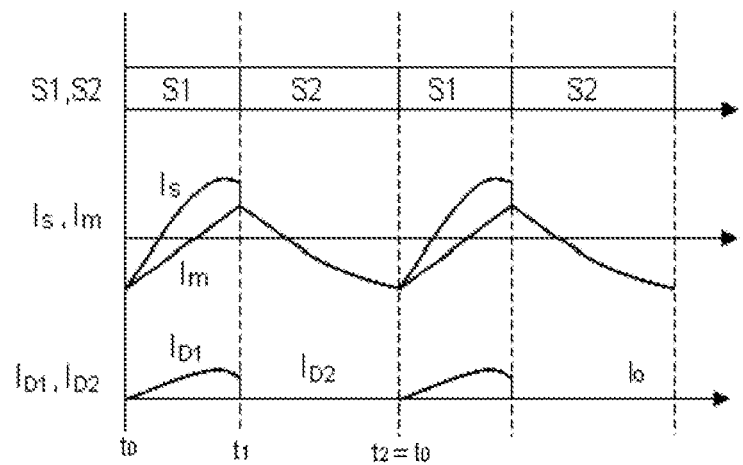
FIG. 11 is a current and voltage waveform diagram of FIG. 10 (D<0.5) according to one embodiment of the present disclosure.

When the control unit 150 controls that the duty ratio of the first switch S1 is less than 0.5, a circuit operation method of novel high-gain control mode is described as follows:

The state 1: when the control unit 150 turns on the first switch S1 and turns off the second switch S2, the voltage of the resonant capacitor $C_s$ is $D \times V_i$, and $n \times V_o < (1-D) \times V_i$. At this time, the resonant capacitor $C_s$ and the resonant inductor $L_s$ works in resonance, and therefore the transformer transfers energy to a secondary side by a clamping voltage $n \times V_o$ of the magnetizing inductor $L_m$; and The state 2: when the control unit 150 turns off the first switch S1 and turns on the second switch S2, the voltage of the resonant capacitor $C_s$ is $D \times V_i$, and $D \times V_i < n \times V_o$. Since the voltage is not enough, the transformer is incapable of transferring energy to the secondary side. At this time, the resonant capacitor $C_s$, the resonant inductor $L_s$ and the magnetizing inductor $L_m$ works in resonance. The current and voltage waveform diagram as shown in FIG. 11.

Likewise when the control unit 150 controls that the duty ratio of the first switch S1 is greater than 0.5, another circuit operation method of novel high-gain control mode is described as follows:

The state 1: when the control unit 150 turns on the first switch S1 and turns off the second switch S2, the voltage of the resonant capacitor $C_s$ is $D \times V_i$, and $n \times V_o > (1-D) \times V_i$. Since the voltage is not enough, the transformer is incapable of transferring energy to the secondary side. At this time, the resonant capacitor $C_s$, the resonant inductor $L_s$ and the magnetizing inductor $L_m$ works in resonance; and The state 2: when the control unit 150 turns off the first switch S1 and turns on the second switch S2, the voltage of the resonant capacitor $C'_s$ is $D \times V_i$, and $D \times V_i > n \times V_o$. At this time, the resonant capacitor $C_s$ and the resonant inductor $L_s$ works in resonance, and therefore the transformer transfers energy to a secondary side by a clamping voltage $n \times V_o$ of the magnetizing inductor $L_m$.

The novel high-gain control mode of the present invention is to control the duty ratio and intermittent mode when the state of circuitry works in the light-load, so as to accomplish the object of controlling the output voltage.

Under the novel high-gain control mode, the parameters selection of the LLC series resonant circuit is described as follows:

The duty ratio of the first switch S1 is D, and the duty ratio of the second switch S2 is (1−D), where D is between 0-0.5. For ensuring that the voltage gain is greater than 1, the value range of the duty ratio D is:

$$\frac{1-\frac{1}{h}}{6}\left[1-2\cos\left(\theta-\frac{2\pi}{3}\right)\right] < D < \frac{1-\frac{1}{h}}{6}\left[1-2\cos\left(\theta+\frac{2\pi}{3}\right)\right]$$

Wherein $$\theta = \frac{1}{3}\arccos\left[\frac{180 fL_s}{n^2 R_L\left(1-\frac{1}{h}\right)^3} - 1\right], \text{ and } \frac{2fL_s}{n^2 R_L} < \frac{1}{27}\left(1-\frac{1}{h}\right)^3, h = \frac{L_s}{L_m} > 1$$

and when $D = \sqrt[3]{\frac{A}{B}\left(1+\sqrt{1+\frac{A}{B}}\right)} - \sqrt[3]{\frac{A}{B}\left(1-\sqrt{1+\frac{A}{B}}\right)}$, in which $A = \frac{2fL_s}{n^2 R_L}$, $B = 1 + \frac{1}{h}$, the circuitry gain is maximum.

Figure 12:
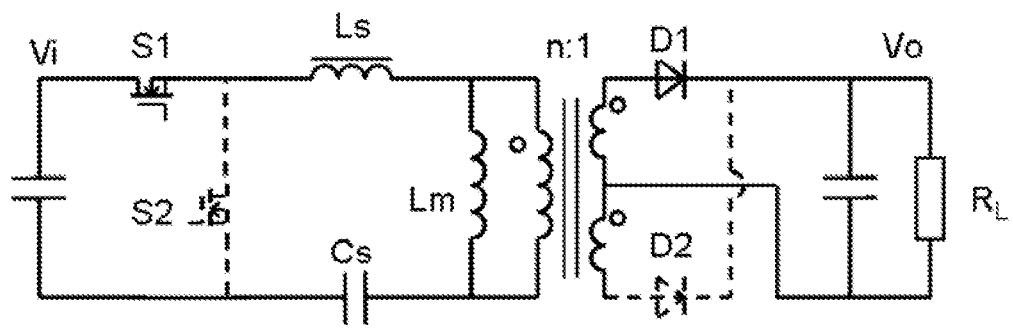
FIG. 12 is an circuitry operation diagram of FIG. 10 when S1 is turned on (D<0.5) according to one embodiment of the present disclosure.
Figure 13:
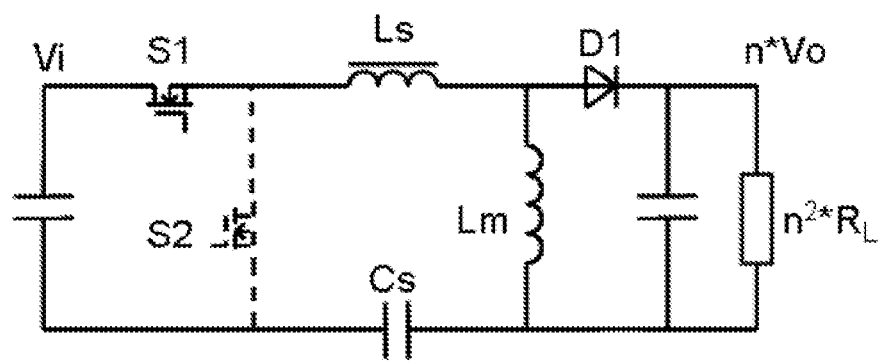
FIG. 13 is an equivalent-circuit diagram of FIG. 10 when S1 is turned on (D<0.5) according to one embodiment of the present disclosure.
Figure 14:
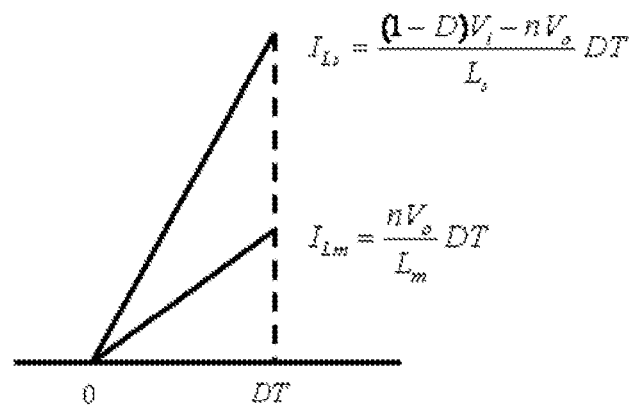
FIG. 14 is a current graph of illustrating gain calculation according to one embodiment of the present disclosure.

The reason is described as follows:

Under D is between 0-0.5, the circuitry operation is shown in FIG. 12. The converter in Stage 1 outputs transmission energy from input. In this stage, an equivalent-circuit diagram is shown in FIG. 13. Because the ripple of the voltage of the resonant capacitor $C_s$ is very small, the current through the resonant inductor $L_s$ and the magnetizing inductor $L_m$ can be linearization as shown in FIG. 14. The voltage and current of the resonant capacitor $C_s$, the resonant inductor $L_s$ and the magnetizing inductor $L_m$ can be computed by integral calculus. By calculating the current of the converter, the circuitry gain M can be approximately obtained as follows:

$$\begin{cases} V_{Cs(Avg.)} = D * V_i \\ \frac{nV_o}{n^2 R_L}T \approx \left[\frac{(1-D)V_i - nV_o}{L_s} - \frac{nV_o}{L_m}\right] * DT * \frac{DT}{2} \end{cases}$$

$$M = \frac{2nV_o}{V_i} \approx \frac{2(1-D)D^2}{\frac{2fL_s}{n^2 R_L} + \left(1+\frac{1}{h}\right)D^2} = \frac{2(1-D)D^2}{A + BD^2}$$

Wherein $A = \frac{2fL_s}{n^2 R_L}$, $B = 1 + \frac{1}{h}$

Alternatively, the circuitry gain can be obtained by calculating the transmission energy of the converter.

Figure 15:
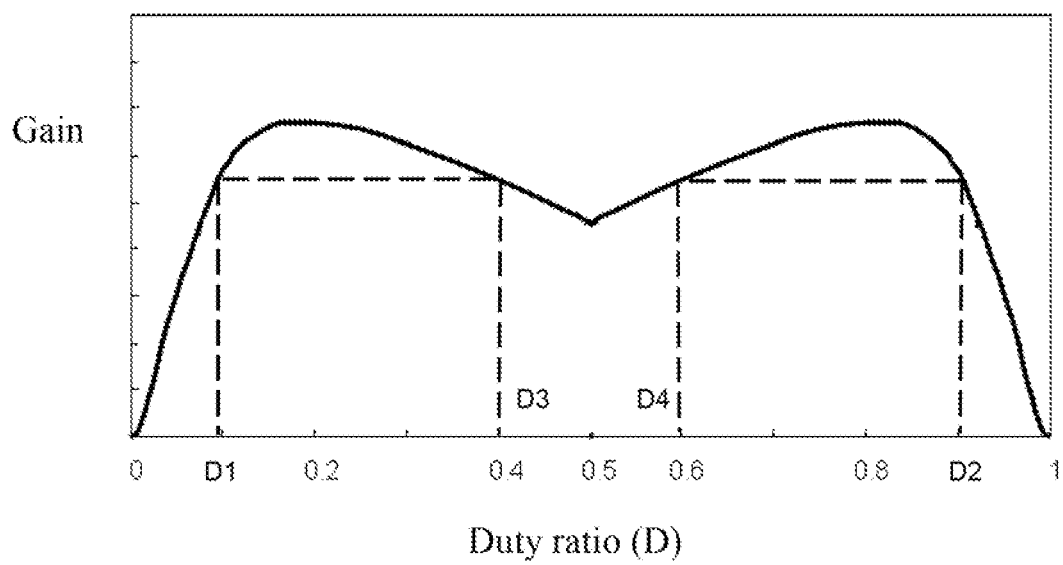
FIG. 15 illustrates a gain curve of a method of controlling the LLC series resonant circuit according to one embodiment of the present disclosure.

FIG. 15 shows a relation curve between the gain and the duty ratio D according to one embodiment of the present disclosure. When the duty ratio D is within above predetermined range, i.e., a first predetermined range (D1,D3) and a second predetermined range (D4,D2), the gain of the circuitry is greater than 1. It should be noted that the first lower limit value D1, the first upper limit value D3, the second lower limit value D4, the second upper limit value D2 are not constant values, and depend on the load $R_L$ and resonant parameters.

If $M > 1$, $\frac{2(1-D)D^2}{A+BD^2} > 1$, i.e., $2D^3 + (B-2)D^2 + A < 0$

If $f(D) = 2D^3 + (B-2)D^2 + A$, $f'(D) = 6D^2 + 2(B-2)D$.

When $f'(D) = 0$, $$D = 0 \text{ or } D = \frac{2-B}{3}.$$

When D=0, f(0)=A>0. And when D=0.5, the duty ratio of S1 is equal to the duty ratio of S2, and the working frequency is higher than a resonance frequency, in view of the above, M<1, and therefore f(0.5)>0.

If M>1, f(D)<0. For setting a value range so that f(D)<0, D' within 0-0.5 satisfies f'(D')=0 and f(D')<0.

According to D' ∈(0, 0.5) and $$f'(D') = 0, D' = \frac{2-B}{3} \text{ and } 0 < \frac{2-B}{3} = \frac{1-\frac{1}{h}}{3} < 0.5,$$

and thus h>1. Therefore f(D') satisfies the relationship of:

$$f(D') = f\left(\frac{2-B}{3}\right) = 2\left(\frac{2-B}{3}\right)^3 + (B-2)\left(\frac{2-B}{3}\right)^2 + A = A - \left(\frac{2-B}{3}\right)^3$$

Since $f(D') < 0$, $A < \left(\frac{2-B}{3}\right)^3$, i.e., $\frac{2fL_s}{n^2 R_L} < \frac{1}{27}\left(1-\frac{1}{h}\right)^3$ Therefore, when $$\frac{2fL_s}{n^2 R_L} < \frac{1}{27}\left(1-\frac{1}{h}\right)^3$$

and h>1, the value range exists within 0-0.5, so that the gain can satisfy M>1.

If $f(D)=2D^3+(B-2)D^2+A=0$, the solutions can be obtained by using Cardano formula:

$$\begin{cases} D_1 = \frac{B-2}{6}\left[2\cos\left(\theta-\frac{2\pi}{3}\right)-1\right] \\ D_2 = \frac{B-2}{6}\left[2\cos\left(\theta+\frac{2\pi}{3}\right)-1\right] \\ D_3 = \frac{B-2}{6}(2\cos\theta - 1) \end{cases}$$

wherein $\theta = \frac{1}{3}\arccos\left[\frac{2A}{\left(\frac{2-B}{3}\right)^3} - 1\right]$, $A = \frac{2fL_s}{n^2 R_L}$, $B = 1 + \frac{1}{h}$ because $\theta = \frac{1}{3}\arccos\left[\frac{2A}{\left(\frac{2-B}{3}\right)^3} - 1\right]$, $\theta \in \left(0, \frac{\pi}{3}\right)$, and $$\begin{cases} 2\cos\left(\theta - \frac{2\pi}{3}\right) - 1 \in (-2, 0) \\ 2\cos\left(\theta + \frac{2\pi}{3}\right) - 1 \in (-3, -2) \\ 2\cos\theta - 1 \in (0, 1) \end{cases}$$

Thus, $D_3 < 0 < D_1 < D_2$.

In view of the above, when the working frequency is higher than a resonance frequency, and the value range of D exists within 0-0.5 so that M>1, the condition is: h>1, and $$\frac{2fL_s}{n^2R_L} < \frac{1}{27}\left(1-\frac{1}{h}\right)^3,$$

where the value range of D satisfies the relationship of:

$$\frac{1-\frac{1}{h}}{6}\left[1-2\cos\left(\theta-\frac{2\pi}{3}\right)\right] < D < \frac{1-\frac{1}{h}}{6}\left[1-2\cos\left(\theta+\frac{2\pi}{3}\right)\right].$$

Since $M(D) = \frac{2(1-D)D^2}{A+BD^2}$, in which $A = \frac{2fL_s}{n^2R_L}, B = 1+\frac{1}{h}$, $$M'(D) = \left(\frac{2(1-D)D^2}{A+BD^2}\right)' = -2D\frac{BD^3+3AD-2A}{(A+BD^2)^2}$$

If $f(D)=BD^3+3AD-2A=0$, by Cardano formula, the real root of this function is obtained as follows:

$$D = \sqrt[3]{\frac{A}{B}\left(1+\sqrt{1+\frac{A}{B}}\right)} - \sqrt[3]{\frac{A}{B}\left(1-\sqrt{1+\frac{A}{B}}\right)}$$

Thus, when D is within 0-0.5, and $$D = \sqrt[3]{\frac{A}{B}\left(1+\sqrt{1+\frac{A}{B}}\right)} - \sqrt[3]{\frac{A}{B}\left(1-\sqrt{1+\frac{A}{B}}\right)},$$

in which $$A = \frac{2fL_s}{n^2R_L}, B = 1+\frac{1}{h},$$

the circuitry gain M is maximum.

When D is within 0.5-1, another value range of D that make M>1 can be solved in a similar manner and satisfies the relationship of:

$$\frac{1-\frac{1}{h}}{6}\left[1-2\cos\left(\theta-\frac{2\pi}{3}\right)\right] < D < 1-\frac{1-\frac{1}{h}}{6}\left[1-2\cos\left(\theta+\frac{2\pi}{3}\right)\right]$$

Wherein $$\theta = \frac{1}{3}\arccos\left[\frac{180fL_s}{n^2R_L\left(1-\frac{1}{h}\right)^3}-1\right], \text{ and } \frac{2fL_s}{n^2R_L} < \frac{1}{27}\left(1-\frac{1}{h}\right)^3, h = \frac{L_s}{L_m} > 1.$$

Furthermore, when the circuitry gain M is maximum, by using the similar manner, the duty ratio D can be solved and satisfies the relationship of:

$$D = 1 - \sqrt[3]{\frac{A}{B}\left(1+\sqrt{1+\frac{A}{B}}\right)} + \sqrt[3]{\frac{A}{B}\left(1-\sqrt{1+\frac{A}{B}}\right)}, \text{ where}$$

$$A = \frac{2fL_s}{n^2R_L}, B = 1+\frac{1}{h}.$$

A novel high-gain control mode for improving efficiency of the LLC series resonant circuit modulated by the frequency modulation mode (i.e., PFM) in the light-load, and the control mode is as follows: detecting a signal related to a state of the load; when the state of the load is the heavy-load, the converter works in the PFM mode to meet the requirements for high efficiency; when the state of the load is the light-load, the converter works in above high-gain control mode, in which due to high-gain, the on-off times of the converter switch per unit time is reduced for decreasing loss, and thereby improving the efficiency in the light-load.

A novel high-gain control mode for a AC/DC converter is as follows: detecting a signal related to a state of the load; when the state of the load is the heavy-load, the converter working mode is the same with the conventional PFC and LLC working mode; when the state of the load is the light-load, the DC/DC stage works in above high-gain control mode, in which the gain is high, so the output voltage of a PFC stage can be reduced, i.e., the output voltage of the power factor correction device 160 can be reduced; for example, using the control unit 150 to decrease the output voltage of the power factor correction device 160 for increasing the efficiency of the power factor correction device 160, and thereby improving the efficiency in the light-load.

A novel high-gain control mode for a AC/DC converter is as follows: detecting a signal related to a state of the load; when the state of the load is the heavy-load, the converter working mode is the same with the conventional PFC and LLC working mode; when the state of the load is the light-load, the DC/DC stage works in above high-gain control mode, in which the gain is high, when the input alternating current voltage is high, the PFC stage is turned off, i.e., the power factor correction device 160 is turned off. For example, the control unit 150 turns off the power factor correction device 160. When input alternating current voltage is low, the output voltage of the power factor correction device 160 is decreased for improving the efficiency of the converter in the light-load.

In another aspect, a method of controlling the power converter 200 according to one or more embodiments is disclosed herein. The method includes following steps: detecting a signal related to a state of the load $R_L$; when the state of the load $R_L$ is a light-load or a no-load, controlling a ON/OFF state of a first switch S1 and a second switch S2 of a bridge arm by a pulse width modulation mode to convert an input voltage into at least one rectangular wave for the resonant tank 120, wherein a duty ratio of the first switch S1 is within a first or second predetermined range, and a duty ratio of the second switch S2 is complementary to the duty ratio of the first switch S1, whereby a voltage gain of the power converter 200 is greater than 1.

The steps are not recited in the sequence in which the steps are performed. That is, unless the sequence of the steps is expressly indicated, the sequence of the steps is interchangeable, and all or part of the steps may be simultaneously, partially simultaneously, or sequentially performed. It should be noted that those implements to perform the steps in the method are disclosed in above embodiments and, thus, are not repeated herein.

The method further includes: when the state of the load $R_L$ is a heavy-load or a full-load, modulating the rectangular wave in a frequency modulation mode.

The duty ratio of the first switch S1 plus the duty ratio of the second switch S2 equals 1, the duty ratio of the first switch S1 is between a first upper limit D1 that is less than 0.5 and a first lower limit value D3, and the duty ratio of the second switch S2 is between a second lower limit value D4 that is greater than 0.5 and a second upper limit D2.

Alternatively, the duty ratio of the second switch S2 is between a first upper limit D1 that is less than 0.5 and a first lower limit value D3, and the duty ratio of the first switch S1 is between a second lower limit value D4 that is greater than 0.5 and a second upper limit D2.

The method further includes: configuring an electromagnetic interference filter 170 to receive alternating current, the electromagnetic interference filter 170 and a power factor correction device 160 convert the alternating current into the input voltage and provide the input voltage for the output circuit $V_i$.

The method further includes: when the state of the load is the light-load or the no-load, reducing the input voltage $V_i$ provided from the power factor correction device 160.

The method further includes: when the state of the load is the light-load or the no-load, turning off the power factor correction device 160.

Accordingly, because the ON/OFF state of the switches are controlled by the pulse width modulation mode when the state of the load is the light-load or the no-load, in which the working frequency f is higher than the resonance frequency $f_s$ and the voltage gain is greater than 1, the on-off times of the converter switch per unit time is reduced more efficiently and the efficiency in the light-load is improved, so as to meet the requirements for high efficiency in the light-load.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

What is claimed is:

1. A DC/DC converter comprising:
an output circuit having a load;
a resonant tank electrically coupled with the output circuit;
a rectangular wave generator electrically coupled with the resonant tank, the rectangular wave generator having at least one bridge arm including a first switch and a second switch coupled to each other;
a detection unit for detecting a signal related to a state of the load; and
a control unit for controlling a ON/OFF state of the first and second switches by a pulse width modulation mode to convert an input voltage into at least one rectangular wave for the resonant tank when the state of the load is a light-load or a no-load, wherein when the state of the load is a light-load or a no-load, the control unit controls a duty ratio of the first switch to be within a first or second predetermined range and a duty ratio of the second switch to be complementary to the duty ratio of the first switch, wherein the first or second predetermined range is configured to set a voltage gain of the DC/DC converter to be greater than 1.

2. The DC/DC converter of claim 1, wherein when the state of the load is the light-load or the no-load, the working frequency of the rectangular wave is higher than a resonance frequency of the resonant tank.

3. The DC/DC converter of claim 1, wherein when the state of the load is the heavy-load or the full-load, the control unit controls the rectangular wave generator in a frequency modulation mode.

4. The DC/DC converter of claim 1, wherein the duty ratio of the first switch is between a first upper limit that is less than 0.5 and a first lower limit value, and the duty ratio of the second switch is between a second lower limit value that is greater than 0.5 and a second upper limit.

5. The DC/DC converter of claim 1, wherein the duty ratio of the second switch is between a first upper limit that is less than 0.5 and a first lower limit value, and the duty ratio of the first switch is between a second lower limit value that is greater than 0.5 and a second upper limit.

6. The DC/DC converter of claim 1, wherein the load comprises a resistor.

7. The DC/DC converter of claim 6, wherein the output circuit further comprises a transformer and a rectifier both electrically connected to the resistor.

8. The DC/DC converter of claim 7, wherein the resonant tank is a series resonant circuit or a parallel resonant circuit.

9. The DC/DC converter of claim 8, wherein the series resonant circuit is a LC series resonant circuit or a LLC series resonant circuit.

10. The DC/DC converter of claim 9, wherein the LLC series resonant circuit comprises a magnetizing inductor, a resonant inductor and a resonant capacitor connected to each other in series, wherein the magnetizing inductor and the transformer are connected in parallel.

11. The DC/DC converter of claim 10, wherein the magnetizing inductor, the resonant inductor and the resonant capacitor connected to the second switch in parallel, and the control unit controls that the duty ratio of the first switch is less than 0.5; when the control unit turns on the first switch and turns off the second switch, the transformer transfers energy to a secondary side by a clamping voltage of the magnetizing inductor.

12. The DC/DC converter of claim 11, wherein when the control unit turns off the first switch and turns on the second switch, the transformer is incapable of transferring the energy to the secondary side.

13. The DC/DC converter of claim 12, wherein the duty ratio of the first switch plus the duty ratio of the second switch equals 1, the duty ratio of the first switch is between a first upper limit that is less than 0.5 and a first lower limit value, and the duty ratio of the second switch is between a second lower limit value that is greater than 0.5 and a second upper limit.

14. The DC/DC converter of claim 10, wherein the magnetizing inductor, the resonant inductor and the resonant capacitor connected to the second switch in parallel, and the control unit controls that the duty ratio of the first switch is greater than 0.5; when the control unit turns on the first switch and turns off the second switch, the transformer is incapable of transferring energy to a secondary side.

15. The DC/DC converter of claim 14, wherein when the control unit turns off the first switch and turns on the second switch, the transformer transfers the energy to the secondary side by a clamping voltage of the magnetizing inductor.

16. The DC/DC converter of claim 15, wherein the duty ratio of the first switch plus the duty ratio of the second switch equals 1, the duty ratio of the second switch is between a first upper limit that is less than 0.5 and a first lower limit value, and the duty ratio of the first switch is between a second lower limit value that is greater than 0.5 and a second upper limit.

17. A power converter comprising:
a DC/DC converter of claims 1;
a power factor correction device electrically coupled with the DC/DC converter; and
an electromagnetic interference filter electrically coupled with the power factor correction device for receiving alternating current, wherein the electromagnetic interference filter and the power factor correction device convert the alternating current into the input voltage and provide the input voltage for the DC/DC converter.

18. The power converter of claim 17, wherein when the state of the load is the light-load or the no-load, the power factor correction device reduces the input voltage provided for the DC/DC converter.

19. The power converter of claim 17, wherein when the state of the load is the light-load or the no-load, the power factor correction device is turned off.

20. The power converter of claim 17, wherein the power factor correction device comprises:
a bridge rectifier; and
a power factor corrector electrically coupled with the bridge rectifier.

21. The power converter of claim 17, wherein the power factor correction device comprises a bridgeless power factor corrector.

22. A method of controlling a power converter, the power converter comprising a resonant tank and an output circuit having a load, the resonant tank electrically coupled with the output circuit, the method comprising:
detecting a signal related to a state of the load; and
when the state of the load is a light-load or a no-load, controlling a ON/OFF state of a first and a second switches of a bridge arm by a pulse width modulation mode to convert an input voltage into at least one rectangular wave for the resonant tank, wherein a duty ratio of the first switch is controlled to be within a first or second predetermined range and a duty ratio of the second switch is controlled to be complementary to the duty ratio of the first switch, wherein the first or second predetermined range is configured to set a voltage gain of the power converter to be greater than 1.

23. The method of claim 22, further comprising:
when the state of the load is the light-load or the no-load, controlling the working frequency of the rectangular wave to be higher than a resonance frequency.

24. The method of claim 23, further comprising:
when the state of the load is a heavy-load or a full-load, modulating the rectangular wave in a frequency modulation mode.

25. The method of claim 23, wherein the duty ratio of the first switch is between a first upper limit that is less than 0.5 and a first lower limit value, and the duty ratio of the second switch is between a second lower limit value that is greater than 0.5 and a second upper limit.

26. The method of claim 23, wherein the duty ratio of the second switch is between a first upper limit that is less than 0.5 and a first lower limit value, and the duty ratio of the first switch is between a second lower limit value that is greater than 0.5 and a second upper limit.

27. The method of claim 23, wherein the output circuit further comprises a transformer, and the resonant tank comprises a magnetizing inductor, a resonant inductor and a resonant capacitor connected to each other in series, wherein the magnetizing inductor and the transformer are connected in parallel, the magnetizing inductor, the resonant inductor and the resonant capacitor connected to the second switch in parallel, and the method further comprises:
controlling that the duty ratio of the first switch is less than 0.5, wherein when the first switch is turned on and the second switch is turned off, the transformer transfers energy to a secondary side by a clamping voltage of the magnetizing inductor; when the first switch is turned off and the second switch is turned on, the transformer is incapable of transferring the energy to the secondary side.

28. The method of claim 27, wherein the duty ratio of the first switch plus the duty ratio of the second switch equals 1, the duty ratio of the first switch is between a first upper limit that is less than 0.5 and a first lower limit value, and the duty ratio of the second switch is between a second lower limit value that is greater than 0.5 and a second upper limit.

29. The method of claim 23, wherein the output circuit further comprises a transformer, and the resonant tank comprises a magnetizing inductor, a resonant inductor and a resonant capacitor connected to each other in series, wherein the magnetizing inductor and the transformer are connected in parallel, the magnetizing inductor, the resonant inductor and the resonant capacitor connected to the second switch in parallel, and the method further comprises:
controlling that the duty ratio of the first switch is greater than 0.5, wherein when the first switch is turned off and the second switch is turned on, the transformer transfers energy to a secondary side by a clamping voltage of the magnetizing inductor; when the first switch is turned on and the second switch is turned off, the transformer is incapable of transferring the energy to the secondary side.

30. The method of claim 29, wherein the duty ratio of the first switch plus the duty ratio of the second switch equals 1, the duty ratio of the second switch is between a first upper limit that is less than 0.5 and a first lower limit value, and the duty ratio of the first switch is between a second lower limit value that is greater than 0.5 and a second upper limit.

31. The method of claim 23, further comprising:
configuring an electromagnetic interference filter to receive alternating current, the electromagnetic interference filter and a power factor correction device convert the alternating current into the input voltage and provide the input voltage for the output circuit.

32. The method of claim 31, further comprising:
when the state of the load is the light-load or the no-load, reducing the input voltage provided from the power factor correction device.

33. The method of claim 31, further comprising:
when the state of the load is the light-load or the no-load, turning off the power factor correction device.

* * * * *